US011307794B2

(12) United States Patent
Ji et al.

(10) Patent No.: US 11,307,794 B2
(45) Date of Patent: Apr. 19, 2022

(54) MEMORY SYSTEM, MEMORY CONTROLLER, AND OPERATION METHOD OF MEMORY SYSTEM

(71) Applicant: SK hynix Inc., Icheon-si (KR)

(72) Inventors: Seung Gu Ji, Icheon-si (KR); Hyung Min Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/095,175

(22) Filed: Nov. 11, 2020

(65) Prior Publication Data

US 2021/0389903 A1 Dec. 16, 2021

(30) Foreign Application Priority Data

Jun. 16, 2020 (KR) .................. 10-2020-0072729

(51) Int. Cl.
*G06F 3/06* (2006.01)
(52) U.S. Cl.
CPC .......... *G06F 3/0655* (2013.01); *G06F 3/0604* (2013.01); *G06F 3/0652* (2013.01); *G06F 3/0679* (2013.01)
(58) Field of Classification Search
CPC .... G06F 3/0679; G06F 3/0652; G06F 3/0604; G06F 3/0655; G06F 3/0688

USPC .................................... 711/154, 103
See application file for complete search history.

(56) References Cited

U.S. PATENT DOCUMENTS

| 2018/0068736 | A1* | 3/2018 | Kim ................... G11C 16/3418 |
| 2019/0114103 | A1* | 4/2019 | Shuck .................. G06F 3/0604 |
| 2019/0332284 | A1* | 10/2019 | Mohammadzadeh ...................... G06F 12/0811 |

FOREIGN PATENT DOCUMENTS

| KR | 10-2012-0092561 | 8/2012 |
| KR | 10-2018-0060885 | 6/2018 |

* cited by examiner

*Primary Examiner* — Hashem Farrokh
(74) *Attorney, Agent, or Firm* — Perkins Coie LLP

(57) ABSTRACT

Memory systems, memory controllers, and operation methods of the memory systems are disclosed. In one example aspect, the memory system may suspend a target operation, such as a program operation or an erase operation, based on whether or not to execute a first operation of resetting a reference read bias when a failure occurs in a read operation executed after the target operation is suspended, and a number of times the target operation is suspended. In this way, the memory system may reduce a delay associated with the suspension of program operations and erasure operations.

20 Claims, 12 Drawing Sheets

NUM_SUSPEND : Number of times target operation is suspended
REF_SUSPEND_1 : First reference number of suspensions NUM_SUSPEND : Number of times target operation is suspended
REF_SUSPEND_1 : First reference number of suspensions

MEMORY SYSTEM, MEMORY CONTROLLER, AND OPERATION METHOD OF MEMORY SYSTEM

CROSS REFERENCE TO RELATED APPLICATION

This patent document claims the priority and benefits of Korean patent application number 10-2020-0072729 filed on Jun. 16, 2020, which is incorporated herein by reference in its entirety.

TECHNICAL FIELD

Embodiments of the disclosed technology relate to a memory system, a memory controller, and an operation method of the memory system.

BACKGROUND

A memory system can include a data storage device to store data. Such a memory system can operate on the basis of a request from a host, such as computers, mobile terminals (e.g., smartphone or tablet PC), or other similar electronic devices. The examples of the memory system span from a device using a magnetic disk as a data storage medium, such as a hard disk drive (HDD), to a device configured to store data in a nonvolatile memory, such as a solid state drive (SSD), a universal flash storage device (UFS), or an embedded MMC (eMMC) device.

The memory system may further include a memory controller for controlling the memory device. The memory controller may receive a command from the host and execute the command or control read/write/erase operations on the memory devices in the memory system. The memory controller may also be used to operate firmware for performing a logical operation for controlling such operations.

Upon occurrence of a predetermined event (such as a request for suspending/read operations from a host) while executing program (write) operations and erasure operations on a memory device in a memory system, the program (write) operations and erasure operations that are already running may have to be suspended. For example, after suspending the program (write) operations and erasure operations, the memory system may execute a read operation in response to a command received from the host, and may resume the suspended operations upon completion of the read operation.

SUMMARY

The technology disclosed in this patent document can be implemented in some embodiments of the disclosed technology may provide a memory system, a memory controller, and an operation method to reduce a delay associated with the suspension of program operations and erasure operations.

In addition, embodiments of the disclosed technology may provide a memory system, a memory controller, and an operation method to reduce the suspension count of program operations or erasure operations.

In one aspect, embodiments of the disclosed technology may provide a memory system including a memory device including memory cells to store data and operable to perform an operation on one or more memory cells including, a read operation for reading data stored in one or more memory cells, a program operation for writing new data into one or more memory cells, or an erase operation for deleting stored data in one or more memory cells and a memory controller in communication with the memory device and configured to control the memory device to perform an operation.

The memory controller may suspend a target operation that is being executed by the memory device based on i) whether or not to execute a first operation of resetting a reference read bias when a failure occurs in a read operation executed after the target operation is suspended, and ii) the number of times the target operation is suspended. In this case, the target operation may be a program operation or an erase operation that has been in progress when suspending the target operation.

The memory controller may suspend the target operation upon a determination that the first operation is not executed, and the suspension count of the target operation is less than a first reference number of suspensions.

The memory controller, when suspending the target operation after the target operation is resumed from a previous suspension, may suspend the target operation only after a predetermined minimum delay time has passed since the resumption of the target operation. In this case, the minimum delay time may be differently determined depending on the target operation.

The memory controller may determine the predetermined minimum delay time depending on whether the suspension count of the target operation is greater than or equal to a second reference number of suspensions when the target operation is an erase operation.

In addition, the memory controller may resume the target operation based on whether the first operation is performed, and based on a number of the read operation executed after the target operation is suspended.

The memory controller, after the target operation is suspended, may resume the suspended target operation upon a determination that the first operation is executed, or the number of the read operation executed after the target operation is suspended is greater than or equal to a first number of read operations.

The memory controller may resume the suspended target operation upon a determination that the target operation is an erase operation, and that the number of the read operation executed after the target operation is suspended is greater than or equal to a second number of read operations.

The memory controller may update the second number of reads depending on whether the total number of the read operation executed while the target operation is in progress is greater than or equal to a third number of read operations. In this case, the third number of read operations may be proportional to the suspension count of the target operation, and a reference number of read operations per suspended operation.

In another aspect, embodiments of the disclosed technology may provide a memory controller including a memory interface configured to communicate with a memory device and a processor configured to communicate with the memory device through the memory interface.

The processor may suspend the target operation based on i) whether a first operation configured to reset a reference read bias is performed upon occurrence of a failure in a read operation executed after the target operation is suspended, and based on ii) a suspension count of the target operation. In this case, the target operation may be a program operation or an erase operation that has been in progress when suspending the target operation.

The processor may suspend the target operation upon a determination that the first operation is not executed, and the suspension count of the target operation is less than a first reference number of suspensions.

When suspending the target operation after the target operation is resumed from a previous suspension, the processor may suspend the target operation only after a predetermined minimum delay time has passed since the resumption of the target operation. In this case, the minimum delay time may be differently determined depending on the target operation.

The processor may determine the predetermined minimum delay time depending on whether the suspension count of the target operation is greater than or equal to a second reference number of suspensions when the target operation is an erase operation.

In addition, the processor may resume the target operation based on whether the first operation is performed, and based on a number of the read operation executed after the target operation is suspended.

The processor may resume the suspended target operation upon a determination that the first operation is executed, or the number of the read operation executed after the target operation is suspended is greater than or equal to a first number of read operations.

The processor may resume the suspended target operation upon a determination that the target operation is an erase operation, and that the number of the read operation executed after the target operation is suspended is greater than or equal to a second number of read operations.

The processor may update the second number of read operations depending on whether the total number of the read operation executed after the start of the target operation is greater than or equal to a third number of reads. In this case, the third number of read operations may be proportional to the suspension count of the target operation, and a reference number of read operations per suspended operation.

In another aspect, an operation method of a memory system may include a step of determining, while a target operation is in progress, i) whether a first operation configured to reset a reference read bias is performed upon occurrence of a failure in a read operation executed after the target operation is suspended, and ii) based pm a suspension count of the target operation. In this case, the target operation may be a program operation or an erase operation that has been in progress when suspending the target operation.

The operation method of the memory system may include a step of suspending the target operation based on whether the first operation is performed, and the suspension count of the target operation.

In addition, the operation method of the memory system may further include a step of resuming the target operation after the target operation is suspended based on whether the first operation is performed, and based on a number of the read operation executed while the target operation is in progress.

In another aspect, a memory system may include a memory device and a memory controller configured to control the memory device. The memory controller, while a target operation is in progress, may suspend the target operation on the basis of i) whether or not to execute a first operation, which is an operation of resetting a reference read bias when a failure occurs in a read operation executed after the target operation is suspended, and ii) the number of times the target operation is suspended. In this case, the target operation may be a program operation or an erase operation.

In another aspect, a memory controller may include a memory interface configured to communicate with a memory device and a processor configured to communicate with the memory device through the memory interface and execute firmware. While a target operation is in progress, the processor may suspend the target operation on the basis of i) whether or not to execute a first operation, which is an operation of resetting a reference read bias when a failure occurs in a read operation executed after the target operation is suspended, and ii) the number of times the target operation is suspended. In this case, the target operation may be a program operation or an erase operation.

In another aspect, an operation method of a memory system may include, while a target operation is in progress, a step of determining i) whether or not to execute a first operation, which is an operation of resetting a reference read bias when a failure occurs in a read operation executed after the target operation is suspended, and ii) the number of times the target operation is suspended. In this case, the target operation may be a program operation or an erase operation.

DETAILED DESCRIPTION OF THE EXEMPLARY EMBODIMENTS

Hereinafter, embodiments of the disclosed technology will be described in detail with reference to the accompanying drawings.

Figure 1:
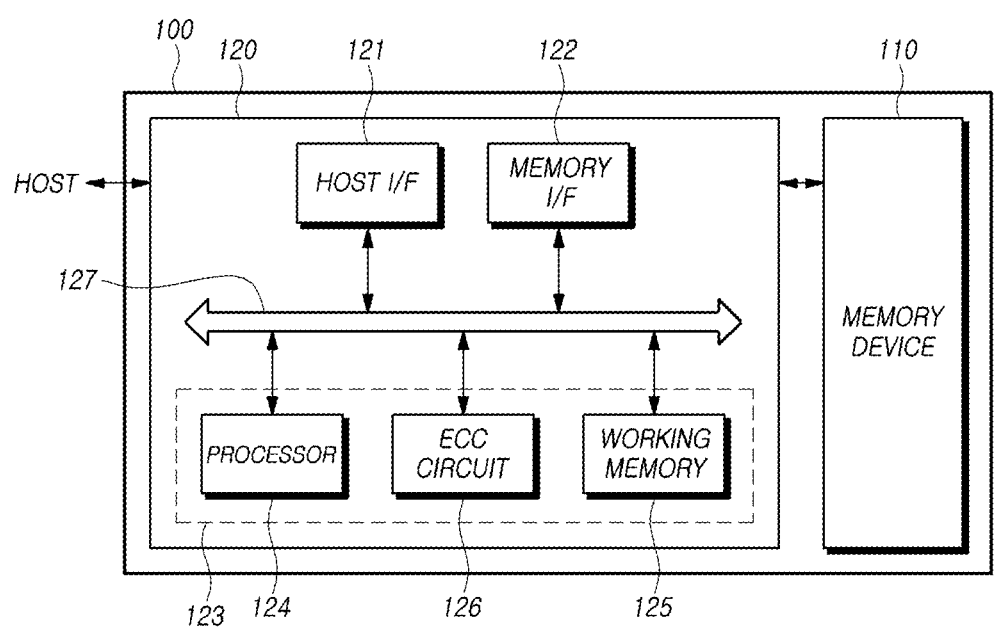
FIG. 1 is a diagram illustrating a schematic configuration of a memory system based on an embodiment of the disclosed technology.

FIG. 1 is a diagram illustrating the schematic configuration of a memory system 100 based on an embodiment of the disclosed technology.

Referring to FIG. 1, the memory system 100 may include a memory device 110 configured to store data, and a memory controller 120 configured to control the memory device 110.

The memory device 110 may include multiple memory blocks each including a predetermined number of memory cells for storing data. The memory device 110 may be configured to operate in response to control signals received from the memory controller 120. Operations of the memory device 110 may include, for example, a read operation for reading data stored in one or more memory cells, a program operation (also referred to as a "write operation") for writing new data into one or more memory cells, and an erasure operation for deleting or erasing data stored in one or more memory cells.

The memory cells in the memory device 110 may be used to store data and may be arranged in a memory cell array. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a conductive floating gate. In another implementations, the electric charge storage layer may be formed of an insulating material, and such a flash memory device is often called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device having a physical address corresponding to the received address from the memory controller 120.

In some implementations, the memory device 110 may perform, among others, a program operation, a read operation, and an erasure operation. During the program (write) operation, the memory device 110 may write data to a memory location selected by the address. During the read operation, the memory device 110 may read data from a memory location selected by the address. During the erasure operation, the memory device 110 may erase data stored in a memory location selected by the address.

The memory controller 120 may control write (program), read, erasure, and background operations to be performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in the absence of a request from the host when it performs such background operations of the memory device.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and commands from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may perform a function of a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 (storage device) and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. For example, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the context of this patent document, the term "sector" may refer to a data unit smaller than the smallest unit for read operations (e.g., page) of a flash memory. Sectors constituting read data may be mapped to addresses.

The error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is labeled as "fail." If the BER is lower than or equals to the reference value, the error detection/correction circuit 126 may determine that the corresponding sector is correctable and the corresponding sector can be labeled as "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address of uncorrectable sector) regarding the sectors deemed uncorrectable to the processor 124.

The memory system 100 may also include a bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are illustrated in FIG. 1 by way of example only. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some implementations, one or more other constituent elements may be added, in addition to the above-mentioned constituent elements of the memory controller 120.

Hereinafter, the memory device 110 will be described in more detail with reference to FIG. 2.

Figure 2:
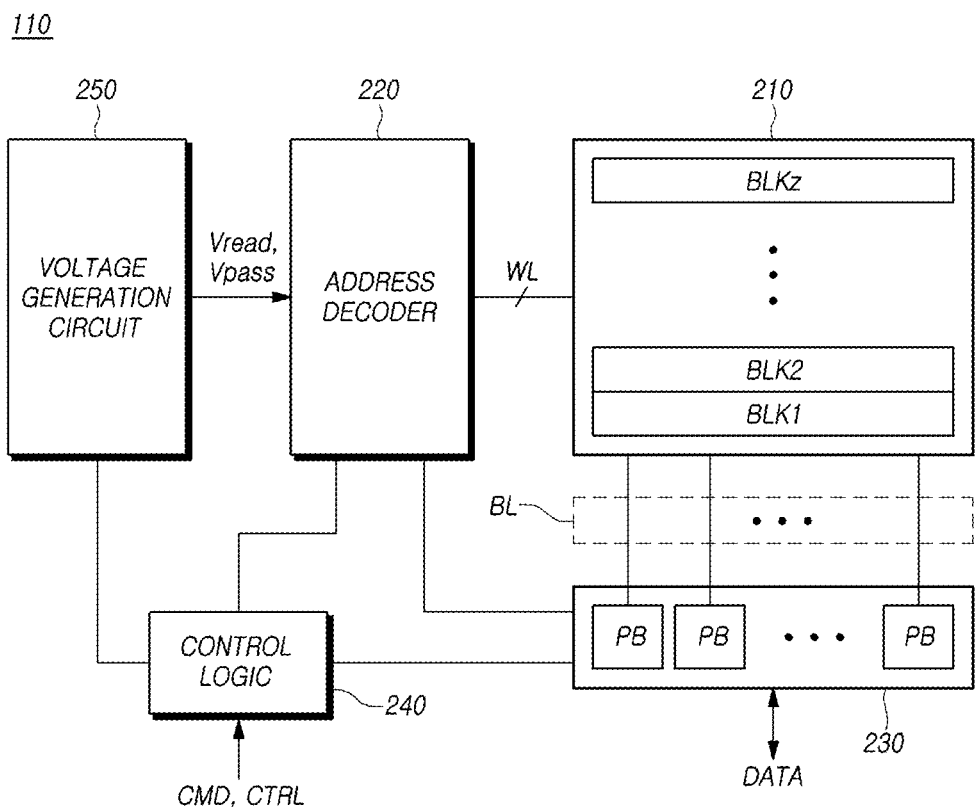
FIG. 2 is a block diagram schematically illustrating a memory device based on an embodiment of the disclosed technology.

FIG. 2 is a block diagram schematically illustrating a memory device 110 based on an embodiment of the disclosed technology.

Referring to FIG. 2, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, to detect, at a sensing node, a change in the amount of electric current that flows caused by the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erasure operation may be performed on a memory block by memory block basis.

Figure 3:
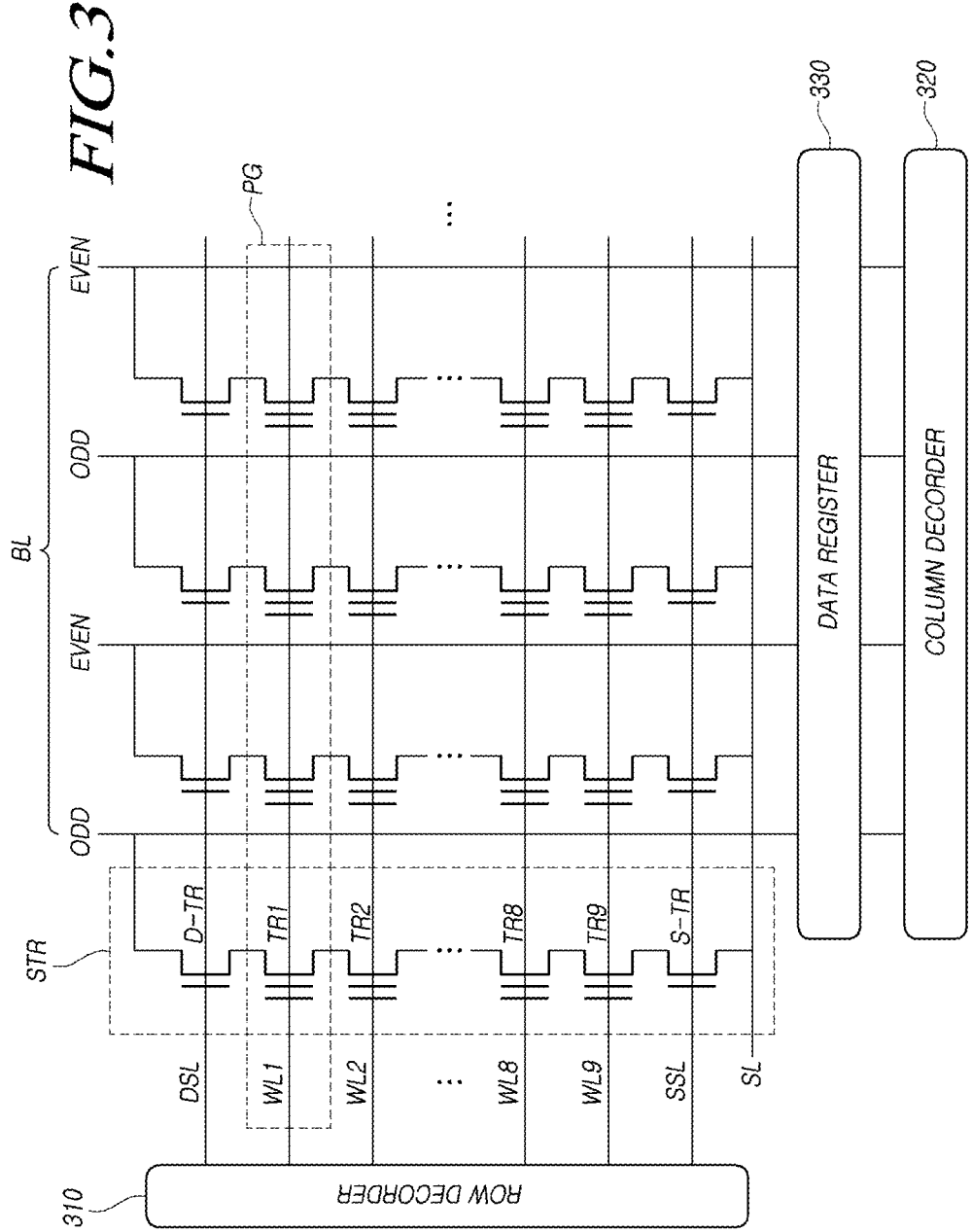
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are concentrated, and an auxiliary area which corresponds to the remaining area other than the core area. The auxiliary area includes circuitry for supporting the operations of the memory cell array 210.

The core area may include pages PG and strings STR. In some implementations, multiple word lines WL1-WL9 and multiple bit lines BL are arranged to be coupled to memory cells and memory cell strings.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320 In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end and then through the row decoder 310 and the column decoder 320 to select a corresponding target memory cell. In the context of this patent document, the term "target memory cell" can be used to indicate one of the memory cells MC targeted to be accessed from the memory controller or the user, and in some implementations the memory cells MC may be located at intersections between the word lines WL1-WL9 connected to the row decoder 310 and the bit lines BL connected to the column decoder 320, for programming data therein or for reading programmed data therefrom.

Pages PG in a first direction (for example, X-axis direction) are connected to a commonly used line referred to as a word line WL, and strings STR in a second direction (for example, Y-axis direction) are connected to a common line referred to as a bit line BL. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 330 plays an essential role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one string STR, multiple transistors TR1-TR9 may be connected to multiple word lines WL1-WL9, respectively. The multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of turning on or off the electric path between the corresponding string STR and the data register 330. The second selection transistor S-TR plays the role of turning on or off the electric path between the corresponding string STR and the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gate FG of the selected memory cell.

Figure 4:
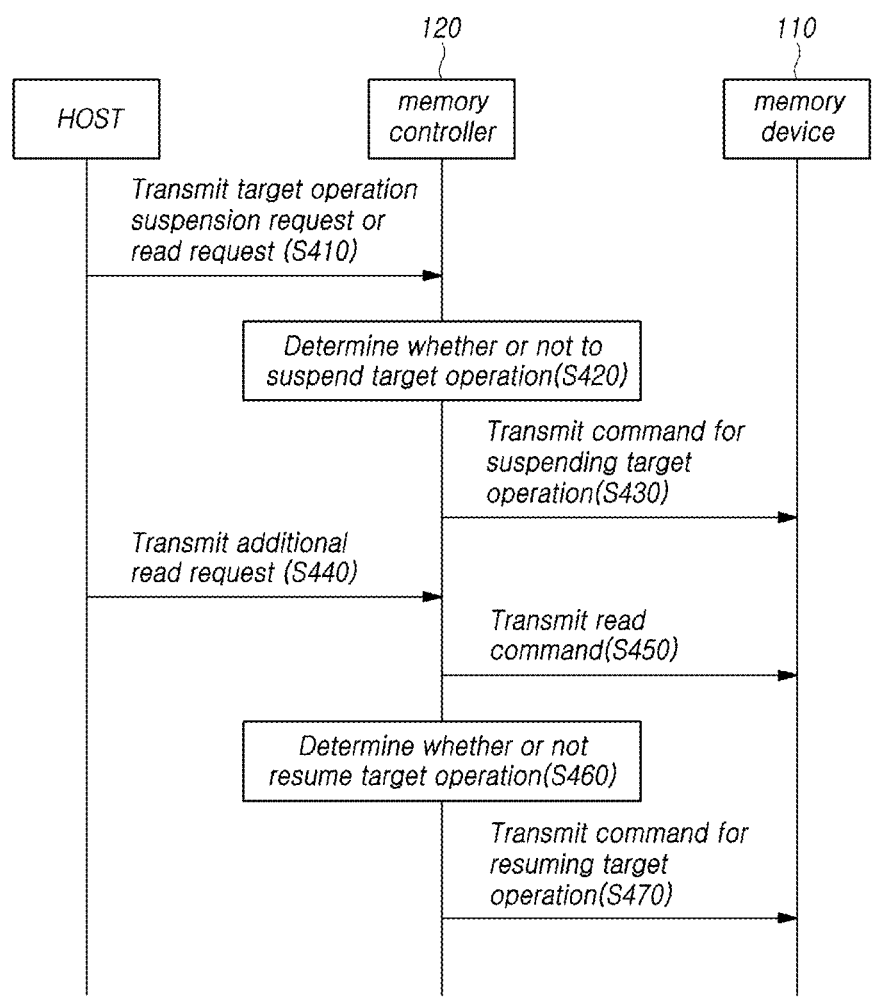
FIG. 4 is a flowchart illustrating an example of the operation of a host, a memory controller, and a memory device based on embodiments of the disclosed technology.

FIG. 4 is a flowchart illustrating an example of the operation of a host HOST, a memory controller 120, and a memory device 110 based on embodiments of the disclosed technology.

Referring to FIG. 4, in the state in which a target operation is in progress, the host HOST may transmit, to the memory controller 120 of the memory system 100, a request for suspending the target operation. For example, while the target operation is in progress, the memory system 100 receives a read request for reading data from the memory device 110 in the memory system 100 (S410). Here, the suspension of the target operation can temporarily prevent the target operation from being performed.

In the context of this patent document, the term "target operation" can be used to indicate operations (e.g., read, program, erase operations) that are targeted or intended to be performed on the memory device. The "target operation" may include operations that are in progress when a certain event requiring suspension of operations. Upon occurrence of the certain event, the on-going operations are suspended, and the suspended operations are resumed upon termination of such an event.

In some implementations, the target operation is a program operation or an erase operation.

Upon receiving the request for suspending the target operation or the read request from the host while the target operation is in progress, the memory controller 120 may determine whether or not to suspend the target operation (S420). In this case, the memory controller 120 may suspend the target operation, and whether to suspend the target operation is determined on the basis of i) whether a first operation is performed to reset a reference read bias when a failure occurs in a read operation executed after the target operation is suspended, and ii) the suspension count of the target operation, as will be discussed below with reference to FIG. 5.

When suspending the target operation, the memory controller 120 may transmit, to the memory device 110, a suspend command instructing the memory device to suspend the target operation, thereby suspending the target operation (S430).

After the target operation is suspended, the host HOST may transmit read requests to the memory controller 120 (S440). In order to process one or more read requests received from the host HOST, the memory controller 120 may transmit a read command to the memory device 110, thereby controlling the memory device to execute a read operation (S450). Steps S440 and S450 may not be executed if there is no additional read request from the host HOST after the target operation is suspended.

Apart from the above-described steps, after the target operation is suspended, the memory controller 120 may determine whether or not to resume the suspended target operation (S460). In this case, the memory controller 120 may resume the suspended target operation on the basis of i) whether or not to execute the first operation described above, and ii) the number of read operations executed while the target operation is in progress, as will be discussed below with reference to FIGS. 8 and 9.

When the memory controller 120 resumes the target operation, the memory controller 120 may transmit, to the memory device 110, a resume command instructing the memory device to resume the suspended target operation, thereby resuming the target operation (S470).

Figure 5:
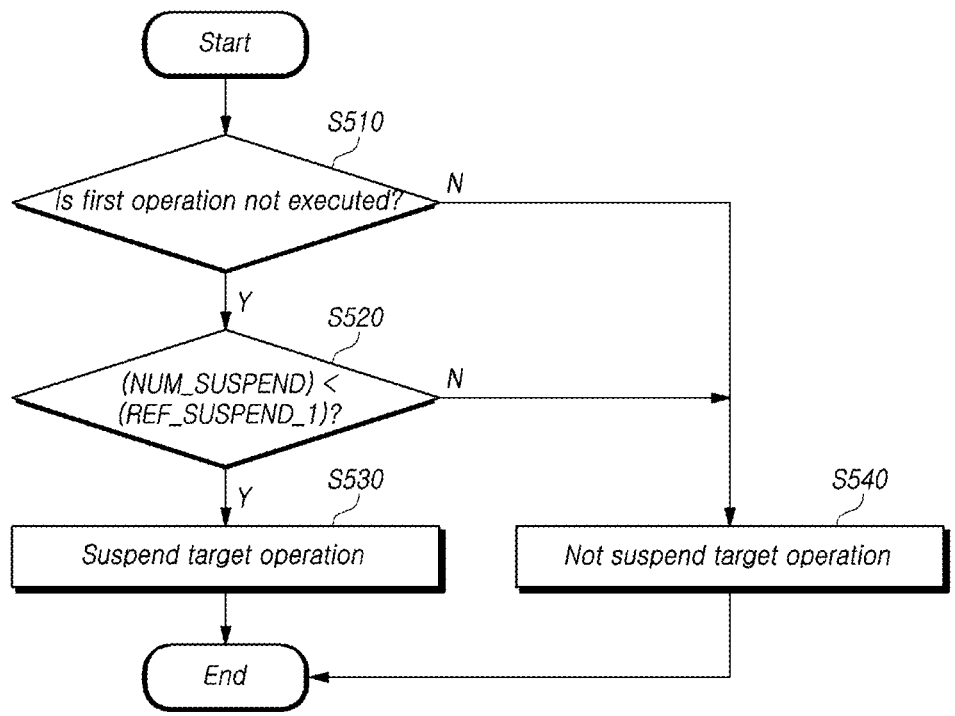
FIG. 5 is a flowchart illustrating an example in which a memory system determines whether or not to suspend a target operation based on embodiments of the disclosed technology.

FIG. 5 is a flowchart illustrating an example in which the memory system 100 determines whether or not to suspend a target operation based on embodiments of the disclosed technology.

Referring to FIG. 5, the memory controller 120 of the memory system 100 determines whether a first operation is not executed. In an implementation, the first operation is performed to reset a reference read bias when a failure occurs in a read operation executed after the target operation is suspended (S510). If the first operation is executed ("N" in S510), the memory controller 120 does not suspend the target operation (S540).

The memory controller 120 may control the memory device 110 to execute a read retry operation for re-executing a read operation based on one or more set read biases when a failure occurs in a read operation executed after the target operation is suspended.

However, if a failure continues to occur even after executing the read retry operation, the memory controller 120 may determine that the threshold voltage distribution of the memory cells included in the memory device 110 has deteriorated (e.g., shift to one direction or widen), and may control the memory device 110 to reset a reference read bias used to read data stored in the memory cells. The memory controller 120 may repeat a process of reading data stored in the memory cells while adjusting the reference read bias value in order to reset the reference read bias value.

In this case, while the memory controller 120 repeatedly adjusts the reference read bias value to discover an optimal reference read bias, such repetitive read operations result in extended time in the suspension of the target operation. As a result, the time required for the target operation to be completed may significantly increase.

Therefore, the memory controller 120 implemented based on some embodiments of the disclosed technology does not suspend the target operation when the first operation is executed.

On the other hand, when the first operation is not executed ("Y" in S510), the memory controller 120 determines whether or not a suspension count of the target operations (the number of iterations the target operation is suspended) NUM_SUSPEND is less than a first reference number of suspensions REF_SUSPEND_1 (S520). The first reference number of suspensions REF_SUSPEND_1 denotes the maximum number of iterations the target operation can be suspended while the target operation is in progress. The first reference number of suspensions may vary depending on the target operation.

For example, the first reference number of suspensions REF_SUSPEND_1 may be set to 60 when the target operation is an erase operation, and the first reference number of suspensions REF_SUSPEND_1 may be set to 3 when the target operation is a program operation. Since the time required for the erase operation is greater than the time required for the program operation, the first reference number of suspensions REF_SUSPEND_1 in the case of the erase operation may be set to a greater number than the first reference number of suspensions REF_SUSPEND_1 in the case of the program operation.

If the suspension count of the target operation NUM_SUSPEND is less than the first reference number of suspensions REF_SUSPEND_1 ("Y" in S520), the memory controller 120 may suspend the target operation (S530).

On the other hand, if the suspension count of the target operation NUM_SUSPEND is greater than or equal to the first reference number of suspensions REF_SUSPEND_1 ("N" in S520), the memory controller 120 does not suspend the target operation (S540). This is intended to prevent a problem in that the end time of the target operation is delayed due to an increase in the suspension count of the target operation.

In some implementations, the memory controller 120 suspends the target operation in step S530 as will be discussed below with reference to FIGS. 6 and 7.

Figure 6:
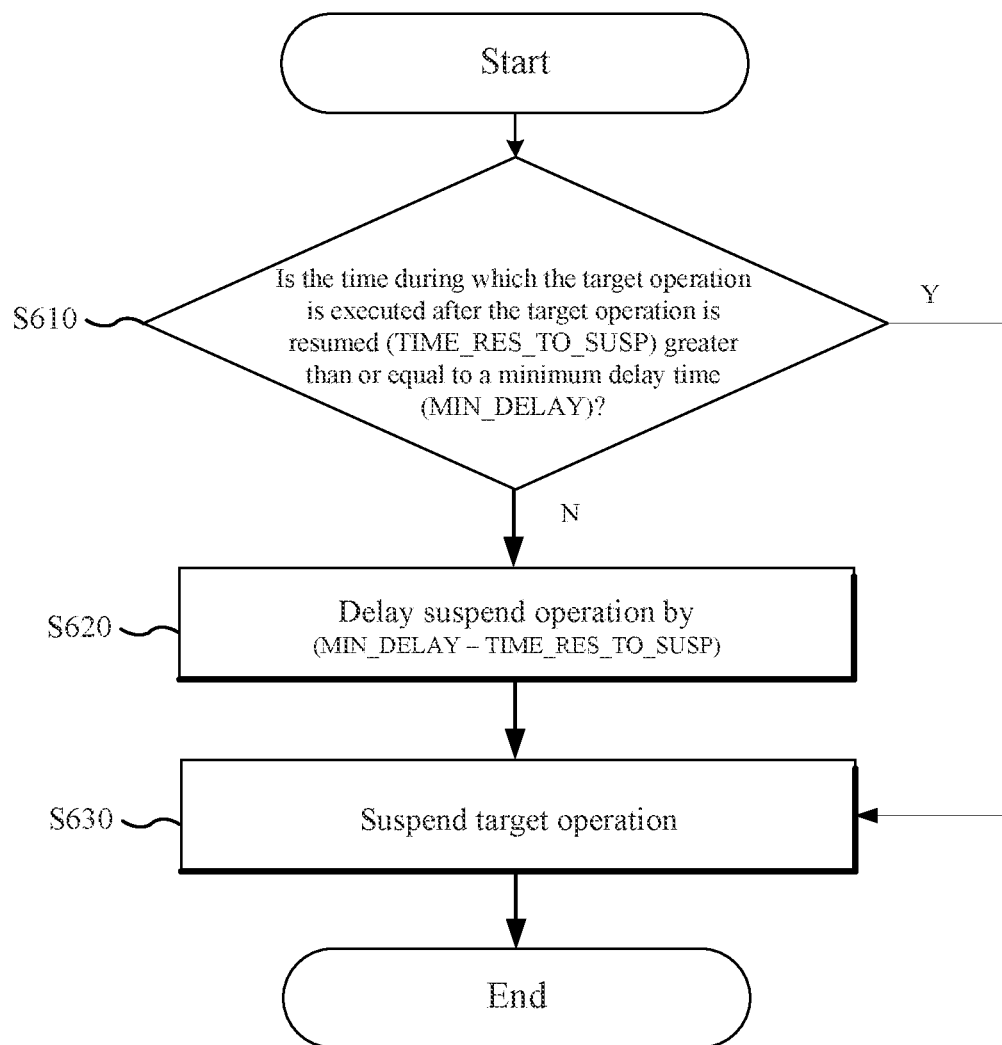
FIG. 6 is a flowchart illustrating an example in which a memory system suspends a target operation based on embodiments of the disclosed technology.
Figure 7:
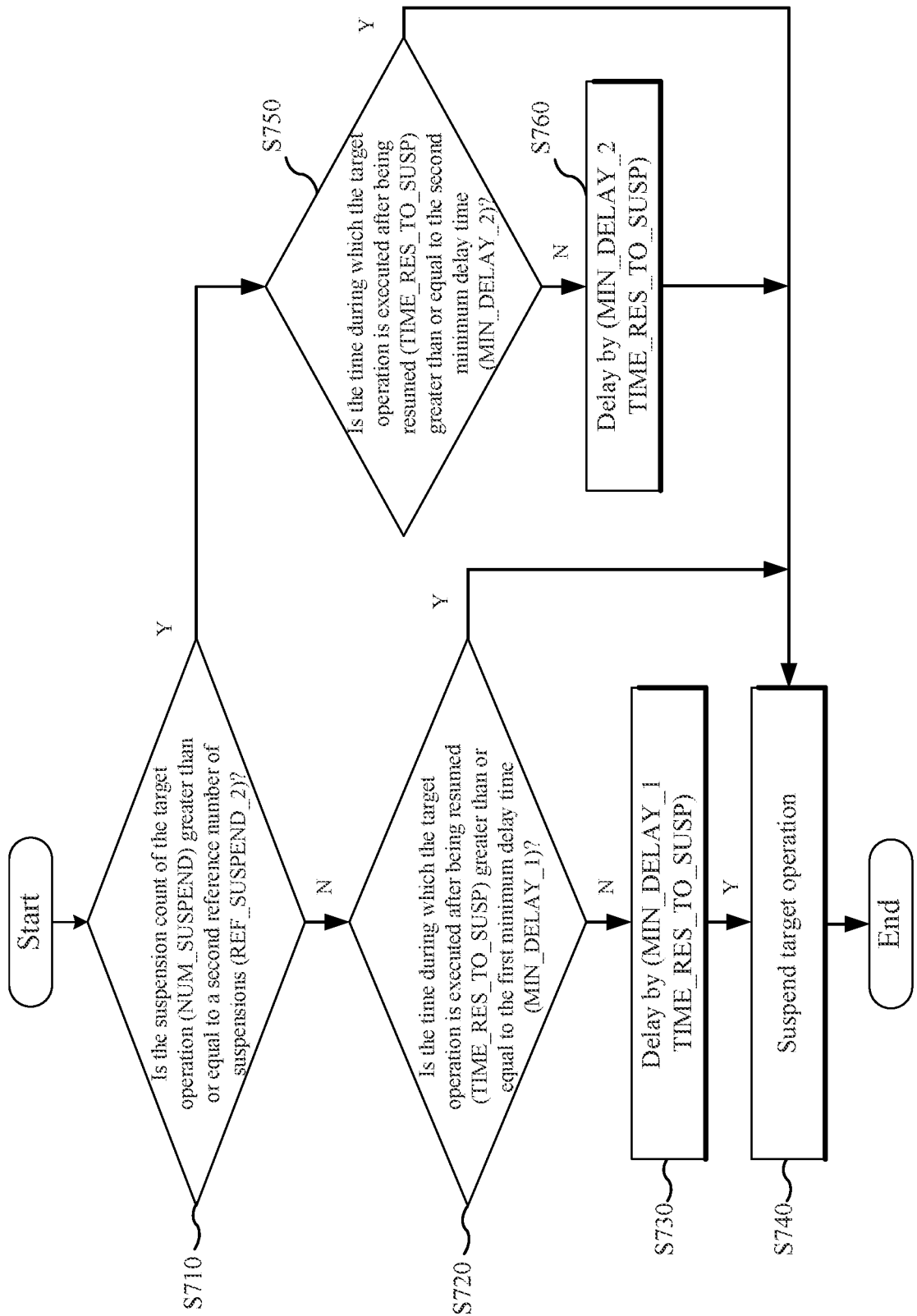
FIG. 7 is a flowchart illustrating another example in which a memory system suspends a target operation based on embodiments of the disclosed technology.

In FIGS. 6 and 7, the target operation is suspended after the target operation is resumed. is not applied to the case where the target operation is suspended for the first time after the target operation is started. When suspending the target operation for the first time after the target operation is started, the memory controller 120 may immediately suspend the target operation.

FIG. 6 is a flowchart illustrating an example in which a memory system 100 suspends a target operation based on embodiments of the disclosed technology.

When suspending the target operation again after the target operation is resumed, the memory controller 120 of the memory system 100 determines whether or not the time during which the target operation is executed after the target operation is resumed TIME_RES_TO_SUSP is greater than or equal to a minimum delay time MIN_DELAY (S610). The memory controller 120 may measure the time at which the target operation is resumed and the current time using a timer (e.g., RTC), thereby calculating the time during which the target operation is executed after the target operation is resumed TIME_RES_TO_SUSP.

In this case, the minimum delay time MIN_DELAY may be determined depending on the target operation. That is, the minimum delay time MIN_DELAY applied when the target operation is a program operation may be different from the minimum delay time MIN_DELAY applied when the target operation is an erase operation.

If the time during which the target operation is executed after the target operation is resumed TIME_RES_TO_SUSP is less than the minimum delay time MIN_DELAY ("N" in S610), in order to execute the target operation for the minimum delay time MIN_DELAY or more, the memory controller 120 may delay a suspend operation by the difference between the minimum delay time MIN_DELAY and the time during which the target operation is executed after the target operation is resumed TIME_RES_TO_SUSP (S620), and may then suspend the target operation (S630).

For example, if the minimum delay time is 700 us, and if the time during which the target operation is executed after the target operation is resumed is 300 us, the memory controller 120 may suspend the target operation after a delay of 400 us (=700 us−300 us). That is, the memory controller 120 may execute the target operation for at least 700 us after the target operation is resumed, and may then suspend the target operation.

On the other hand, if the time during which the target operation is executed after the target operation is resumed TIME_RES_TO_SUSP is greater than or equal to the minimum delay time MIN_DELAY ("Y" in S610), the memory controller 120 may immediately suspend the target operation (S630).

That is, when suspending the target operation again after the target operation is resumed, the memory controller 120 may suspend the target operation only after executing the target operation for the minimum delay time MIN_DELAY from the resumption of the target operation. If the target operation is suspended immediately after resuming the target operation, a previously suspended sub-operation of the target operation may be required to be re-performed, thereby causing an excessive delay to complete the target operation.

As described above, the minimum delay time MIN_DELAY may vary depending on the target operation.

When the target operation is an erase operation, the minimum delay time MIN_DELAY may be determined depending on whether or not the suspension count of the target operation is greater than or equal to a second reference number of suspensions, as will be discussed below with reference to FIG. 7.

FIG. 7 is a flowchart illustrating another example in which a memory system 100 suspends a target operation based on embodiments of the disclosed technology.

Referring to FIG. 7, if the target operation is an erase operation, the memory controller 120 of the memory system 100 determines whether or not the suspension count of the target operation NUM_SUSPEND is greater than or equal to a second reference number of suspensions REF_SUSPEND_2 (S710). In this case, the second reference number of suspensions REF_SUSPEND_2 is less than the first reference number of suspensions REF_SUSPEND_1 described above.

If the suspension count of the target operation NUM_SUSPEND is less than the second reference number of suspensions REF_SUSPEND_2 ("N" in S710), the memory controller 120 may determine the minimum delay time MIN_DELAY to be a first minimum delay time MIN_DELAY_1, and may suspend the target operation after executing the target operation at least for the first minimum delay time MIN_DELAY_1 from the time at which the target operation is resumed.

Specifically, the memory controller 120 determines whether the time during which the target operation is executed after being resumed TIME_RES_TO_SUSP is greater than or equal to the first minimum delay time MIN_DELAY_1 (S720). If the time during which the target operation is executed after being resumed TIME_RES_TO_SUSP is less than the first minimum delay time MIN_DELAY_1 ("N" in S720), the memory controller 120 may delay the suspend operation by the difference between the first minimum delay time MIN_DELAY_1 and the time during which the target operation is executed after being resumed TIME_RES_TO_SUSP (S730), and may then suspend the target operation thereafter (S740).

On the other hand, if the time during which the target operation is executed after being resumed TIME_RES_TO_SUSP is greater than or equal to the first minimum delay time MIN_DELAY_1 ("Y" in S720), the memory controller 120 may immediately suspend the target operation (S740).

If the suspension count of the target operation NUM_SUSPEND is greater than or equal to the second reference number of suspensions REF_SUSPEND_2 ("Y" in S710), the memory controller 120 may determine the minimum delay time MIN_DELAY to be a second minimum delay time MIN_DELAY_2, and may suspend the target operation after executing the same at least for the second minimum delay time MIN_DELAY_2 or more from the resumption of the target operation.

Specifically, the memory controller 120 determines whether the time during which the target operation is executed after being resumed TIME_RES_TO_SUSP is greater than or equal to the second minimum delay time MIN_DELAY_2 (S750). If the time during which the target operation is executed after being resumed TIME_RES_TO_SUSP is less than the second minimum delay time MIN_DELAY_2 ("N" in S750), the memory controller 120 may delay the suspend operation by the difference between the second minimum delay time MIN_DELAY_2 and the time during which the target operation is executed after being resumed TIME_RES_TO_SUSP (S760), and may suspend the target operation thereafter (S740).

On the other hand, if the time during which the target operation is executed after being resumed TIME_RES_TO_SUSP is greater than or equal to the second minimum delay time MIN_DELAY_2 ("Y" in S750), the memory controller 120 may immediately suspend the target operation (S740).

In this case, the second minimum delay time MIN_DELAY_2 may be greater than or equal to the first minimum delay time MIN_DELAY_1. That is, the memory controller 120 may increase the minimum delay time such that the amount of progress of the target operation performed after a resumption and before a subsequent suspension is larger when the number of suspension iterations is identical to or larger than the second reference number of suspensions REF_SUSPEND_2 compared to when the number of suspension iterations is smaller than the second reference number of suspensions REF_SUSPEND_2, as will be discussed below.

When the erase operation is executed, an erase preparation operation and an operation for applying an erase pulse are internally executed. However, if the suspend operation is repeatedly executed in the process of executing the erase preparation operation, there may be a problem in that the end time of the erase operation is excessively delayed because the erase preparation operation process is restarted from the beginning upon resumption after suspension.

Therefore, the memory controller 120 may increase the minimum delay time MIN_DELAY after the erase operation is suspended for a number of iterations that is identical to or larger than the second reference number of suspensions REF_SUSPEND_2, thereby controlling the memory device 110 such that the erase preparation operation ends within the minimum delay time MIN_DELAY and the operation for applying an erase pulse is executed thereafter.

In some implementations, the memory system 100 can resume the suspended target operation as will be discussed below.

Figure 8:
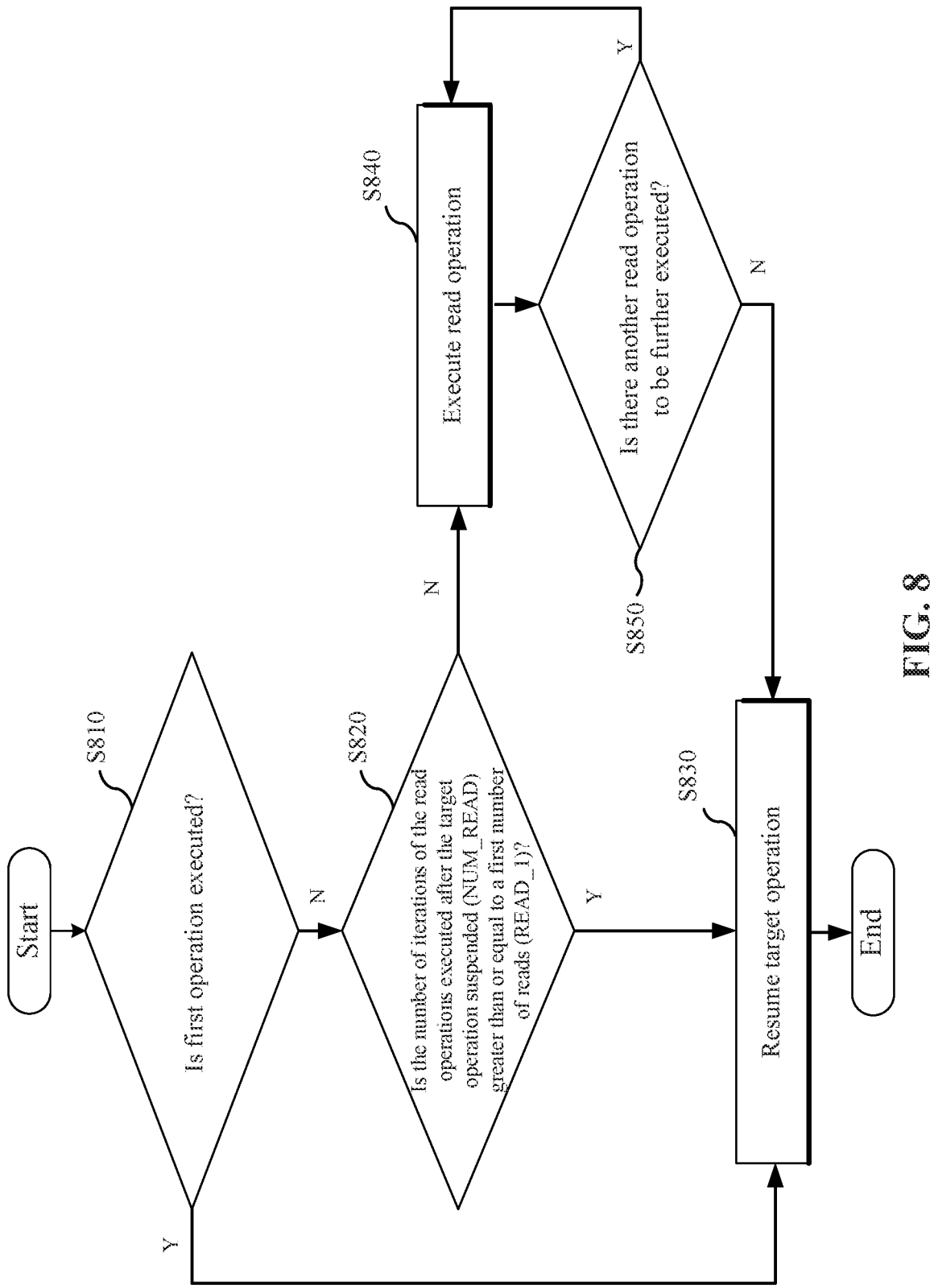
FIG. 8 is a flowchart illustrating an example in which a memory system resumes a suspended target operation based on embodiments of the disclosed technology.

FIG. 8 is a flowchart illustrating an example in which a memory system 100 resumes a suspended target operation based on embodiments of the disclosed technology.

Referring to FIG. 8, the memory controller 120 of the memory system 100 determines whether or not the above-described first operation is executed while a target operation is in progress (S810).

If the first operation is executed ("Y" in S810), the memory controller 120 may resume a suspended target operation (S830) because, when executing the first operation as described above, the memory controller 120 discovers an optimal reference read bias to minimize errors while repeatedly adjusting the reference read bias value, and, in this process, an operation of reading data may be executed many times in the memory device 110, which may cause a problem in that the target operation is continuously suspended.

On the other hand, if the first operation is not executed ("N" in S810), the memory controller 120 determines whether the number of iterations of the read operations is executed after the target operation is suspended NUM_READ is greater than or equal to a first number of reads READ_1 (S820). In this case, the first number of reads READ_1 may be differently determined depending on the target operation.

If the number of iterations of the read operation after the target operation is suspended NUM_READ is greater than or equal to the first number of reads READ_1 ("Y" in S820), the memory controller 120 may resume the target operation (S830) to avoid a potential delay in the target operation because the read operation is executed as many times as the first number of reads READ_1 after the target operation is suspended.

On the other hand, if the number of iterations of the read operation executed after the target operation is suspended is less than the first number of reads READ_1 ("N" in S820), the memory controller 120 may execute the read operation, instead of resuming the target operation (S840). The memory controller 120 may transmit a read command to the memory device 110 to execute a read operation.

In addition, the memory controller 120 may determine whether or not there is another read operation to be further executed (S850). Since the host HOST may transmit a plurality of read requests to the memory controller 120 of the memory system 100 after the target operation is suspended, there may be read operations to be further executed even after the memory controller 120 executes a specific read operation. The memory controller 120 may wait for a predetermined waiting time in order to determine whether or not there is another read operation to be further executed.

If there is another read operation to be further executed ("Y" in S850), the memory controller 120 may perform step S840 again in order to process the additional read operation. On the other hand, if there is no read operation to be further executed ("N" in S850), the memory controller 120 may resume the target operation in order to execute the suspended target operation (S830).

In the case where the target operation is an erase operation, the memory controller 120 of the memory system 100 may determine whether or not to resume the suspended target operation in a different manner from the case where the target operation is a program operation. Hereinafter, this will be described in detail with reference to FIG. 9.

Figure 9:
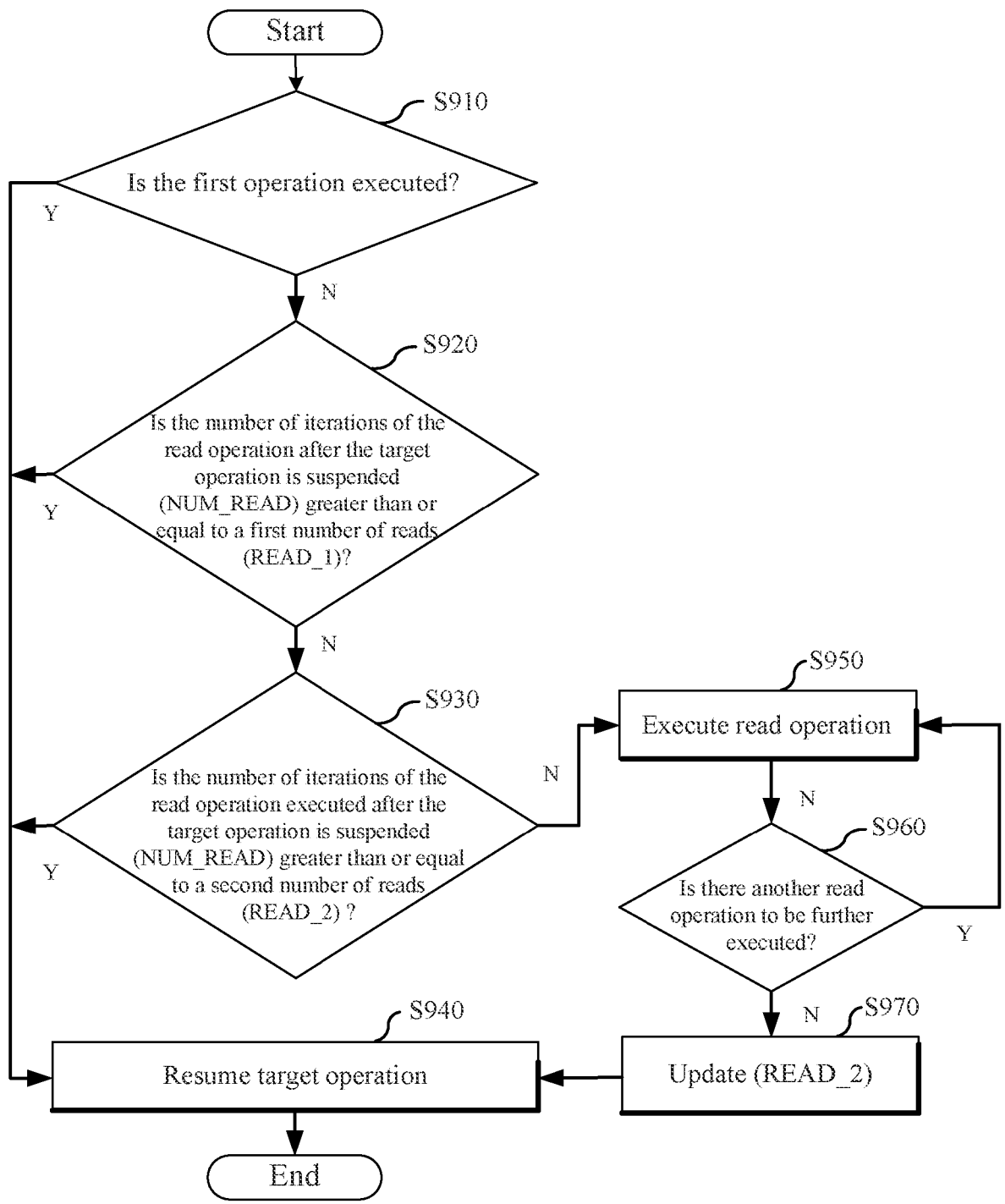
FIG. 9 is a flowchart illustrating another example in which a memory system resumes a suspended target operation based on embodiments of the disclosed technology.

FIG. 9 is a flowchart illustrating another example in which a memory system 100 resumes a suspended target operation based on embodiments of the disclosed technology.

Referring to FIG. 9, the memory controller 120 of the memory system 100 determines whether or not the first operation is executed (S910).

If the first operation is executed ("Y" in S910), the memory controller 120 resumes a suspended target operation (S940).

On the other hand, if the first operation is not executed ("N" in S910), the memory controller 120 determines whether the number of iterations of the read operation after the target operation is suspended NUM_READ is greater than or equal to a first number of reads READ_1 (S920).

If the number of iterations of the read operation executed after the target operation is suspended NUM_READ is greater than or equal to the first number of reads READ_1 ("Y" in S920), the memory controller 120 may resume the target operation (S930).

On the other hand, if the number of iterations of the read operation executed after the target operation is suspended NUM_READ is less than the first number of reads READ_1 ("N" in S920), the memory controller 120 determines whether the number of iterations of the read operation executed after the target operation is suspended NUM_READ is greater than or equal to a second number of reads READ_2 (S930).

The second number of reads READ_2 is the maximum number of read operations that can be executed during the time from the suspension of the target operation to the resumption thereof. For example, if the second number of reads READ_2 is 5, this indicates that the suspended target operation must be resumed after the read operation is executed five times after the target operation is suspended.

In this case, the second number of reads READ_2 is less than the first number of reads READ_1 described above.

If the number of iterations of the read operation executed after the target operation is suspended NUM_READ is greater than or equal to the second number of reads READ_2 ("Y" in S930), the memory controller 120 may resume the target operation (S930).

On the other hand, if the number of iterations of the read operation executed after the target operation is suspended NUM_READ is less than the second number of reads READ_2 ("N" in S930), the memory controller 120 may execute a read operation, instead of resuming the target operation, in order to process the read request from the host HOST (S950).

Then, the memory controller 120 determines whether or not there is another read operation to be further executed (S960). If there is another read operation to be further executed ("Y" in S960), the memory controller 120 may perform step S950 to process the additional read operation. On the other hand, if there is no read operation to be further executed ("N" in S960), the memory controller 120 may update the second number of reads READ_2 (S970), and may then resume the target operation in order to execute the suspended target operation (S940).

Hereinafter, an example of a specific operation in which the memory controller 120 of the memory system 100 updates the second number of reads READ_2 in step S970 will be described.

The memory controller 120 may differently update the second number of reads READ_2 depending on whether the total number of iterations of the read operation executed after the start of the target operation is greater than or equal to a third number of reads READ_3.

Figure 10:
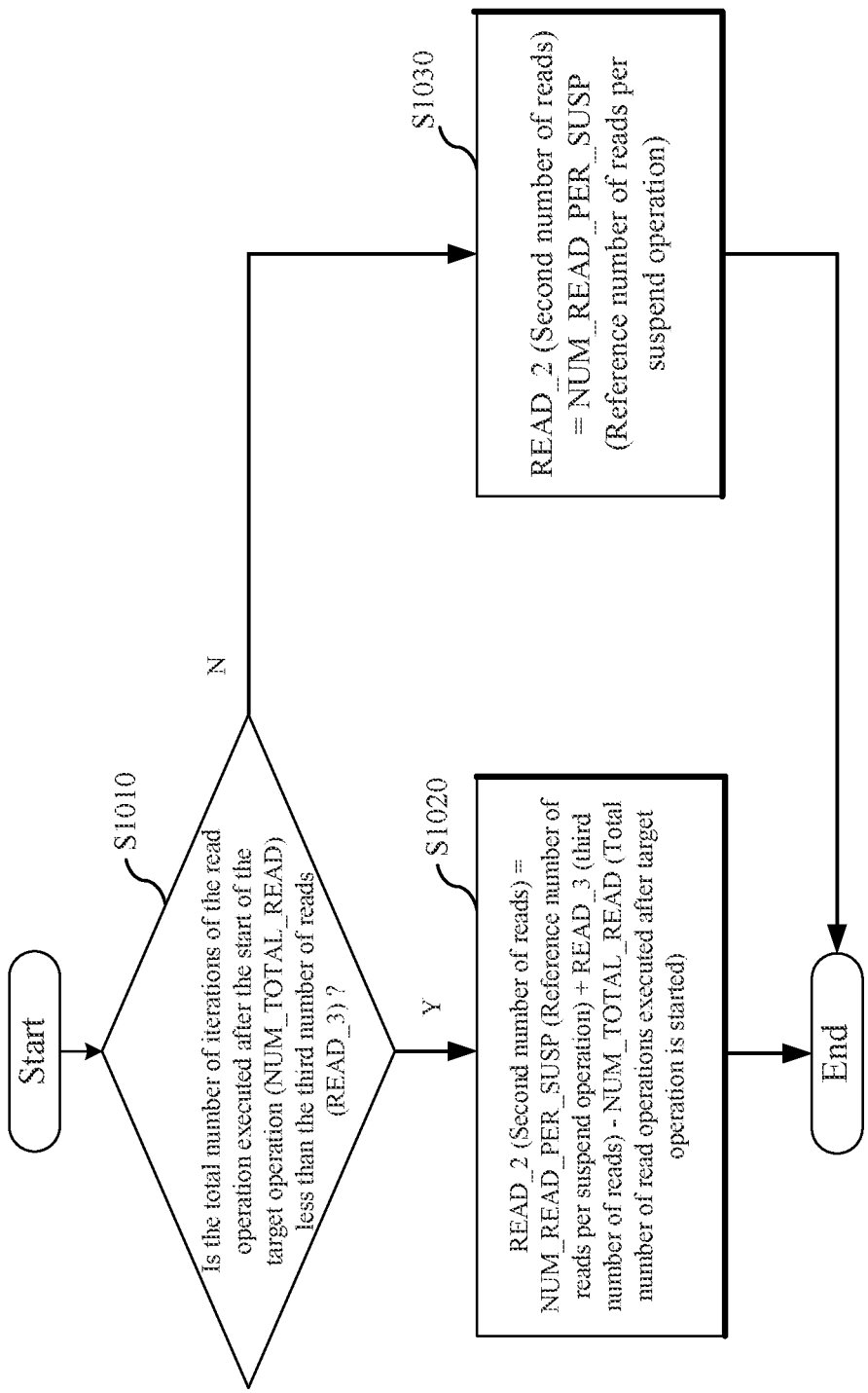
FIG. 10 is a flowchart illustrating an example in which the memory system updates a second number of reads in FIG. 9.

FIG. 10 is a flowchart illustrating an example in which the memory system 100 updates the second number of reads READ_2 described in FIG. 9.

In this case, the third number of reads READ_3 may be proportional to i) the suspension count of the target operation (the number of the target operation) NUM_SUSPEND, and ii) a reference number of reads per suspend operation NUM_READ_PER_SUSP. For example, the third number of reads READ_3 may be a product of the suspension count of the target operation NUM_SUSPEND and a reference number of reads per suspend operation NUM_READ_PER_SUSP.

The reference number of reads per suspend operation NUM_READ_PER_SUSP indicates a reference value of the number of iterations of the read operation executed after the target operation is suspended and before the same is resumed. The reference number of reads per suspend operation is a set value, and may be determined differently depending on the target operation.

The memory controller 120 determines whether or not the total number of iterations of the read operation executed after the start of the target operation NUM_TOTAL_READ is less than the third number of reads READ_3 (S1010).

If the total number of iterations of the read operation executed after the start of the target operation NUM_TOTAL_READ is less than the third number of reads READ_3 ("Y" in S1010), the memory controller 120 may update the second number of reads READ_2 to be "(NUM_READ_PER_SUSP)+(READ_3)−(NUM_TOTAL_READ)" (S1020).

On the other hand, if the total number of iterations of the read operation executed after the start of the target operation NUM_TOTAL_READ is greater than or equal to the third number of reads READ_3 ("N" in S1010), the memory controller 120 may update the second number of reads READ_2 to be the reference number of reads per suspend operation NUM_READ_PER_SUSP (S1030).

For example, it is assumed that the reference number of reads per suspend operation NUM_READ_PER_SUSP is 10, and that the read operation is executed four times during the time from the first suspension of the target operation after being started to the resumption of the same. In addition, it is assumed that the third number of reads READ_3 is determined to be the product of the suspension count of the target operation NUM_SUSPEND and the reference number of reads per suspend operation NUM_READ_PER_SUSP.

In this case, the total number of iteration of the read operation executed after the start of the target operation NUM_TOTAL_READ is 4, which is less than "(READ_3)=(NUM_SUSPEND)*(NUM_READ_PER_SUSP)=1*10=10."

Therefore, the second number of reads READ_2 becomes "10+(1*10)−4=16". That is, since only 4 read operations, which are less than 10 read operations, have been executed since the first suspension of the target operation, the memory controller 120 may increase the second number of reads READ_2 such that (10−4)=6 read operations may be further executed after subsequent suspension of the target operation.

Then, it is assumed that 13 read operations have been executed since the second suspension of the target operation before the resumption thereof.

In this case, the total number of iterations of the read operation executed after the start of the target operation NUM_TOTAL_READ is 4+13=17, which is less than "(READ_3)=(NUM_SUSPEND)*(NUM_READ_PER_SUSP)=2*10=20."

Therefore, the second number of reads READ_2 becomes "10+(2*20)−17=13." That is, since only 17 read operations, which are less than 20 read operations, have been executed while the target operation was suspended twice, the memory controller 120 may increase the second number of reads READ_2 such that (20−17)=3 read operations may be further executed after subsequent suspension of the target operation.

Then, it is assumed that 15 read operations have been executed since the third suspension of the target operation before the resumption thereof.

In this case, the total number of iterations of the read operation executed after the start of the target operation NUM_TOTAL_READ is 4+13+15=32, which is greater than "(READ_3)=(NUM_SUSPEND)*(NUM_READ_PER_SUSP)=3*10=30."

Therefore, the second number of reads READ_2 becomes 10. That is, since 32 read operations, which are greater than 30 read operations, have been executed while the target operation was suspended three times, the memory controller 120 may set the second number of reads READ_2 so as to prevent additional execution of the read operations more than the reference number of reads per suspend operation NUM_READ_PER_SUSP after subsequent suspension of the target operation.

Figure 11:
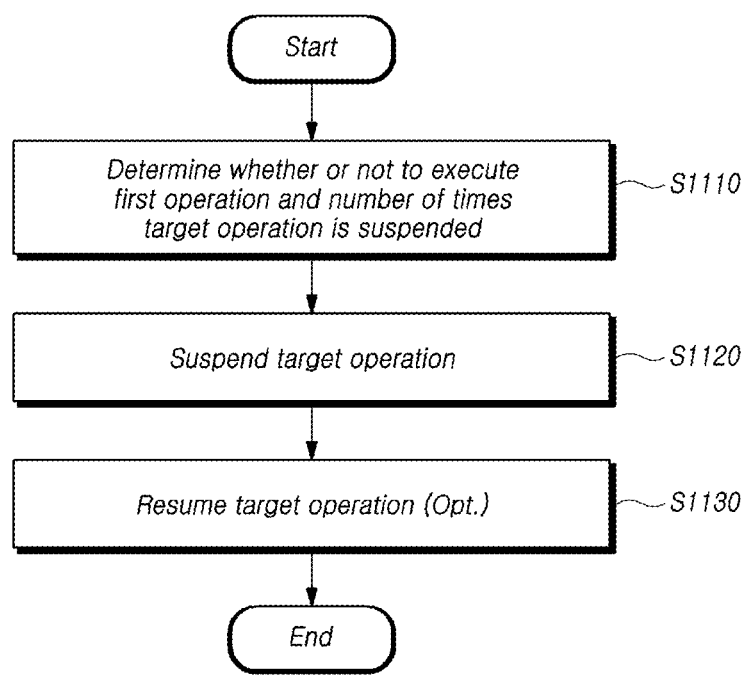
FIG. 11 is a flowchart illustrating an operation method of a memory system based on embodiments of the disclosed technology.

FIG. 11 is a flowchart illustrating an operation method of a memory system 100 based on embodiments of the disclosed technology.

First, the operation method of the memory system 100 may include a step of determining, while a target operation is in progress, i) whether or not to execute a first operation, which is an operation of resetting a reference read bias when a failure occurs in a read operation executed after the target operation is suspended, and ii) the suspension count of the target operation (S1110). In this case, the target operation may be a program operation or an erase operation.

In addition, the operation method of the memory system 100 may include a step of suspending the target operation (S1120). Here, the memory system 100 may suspend the target operation on the basis of i) whether the first operation is performed, and ii) the suspension count of the target operation (the number of suspension iterations of the target operation.

For example, the memory system 100 may suspend the target operation i) if the first operation is not executed, and ii) if the suspension count of the target operation is less than a first reference number of suspensions.

In addition, the operation method of the memory system 100 may further include a step of resuming the suspended target operation after the target operation is suspended in addition to steps S1110 and S1120 (S1130). In this case, the memory system 100 may resume the suspended target operation, and whether to resume the suspended target operation is determined on the basis of i) whether the first operation is performed, and ii) the number of iterations of the read operation executed after the target operation is suspended.

For example, the memory system 100 may resume the suspended target operation i) after the first operation is executed or ii) if the number of iterations of the read operation executed after the target operation is suspended is greater than or equal to a first number of reads.

In some implementations, the operation of the memory controller 120 described above may be controlled by the control circuit 123, and may be performed in such a manner that the processor 124 executes firmware in which the overall operation of the memory controller 120 is programmed.

Figure 12:
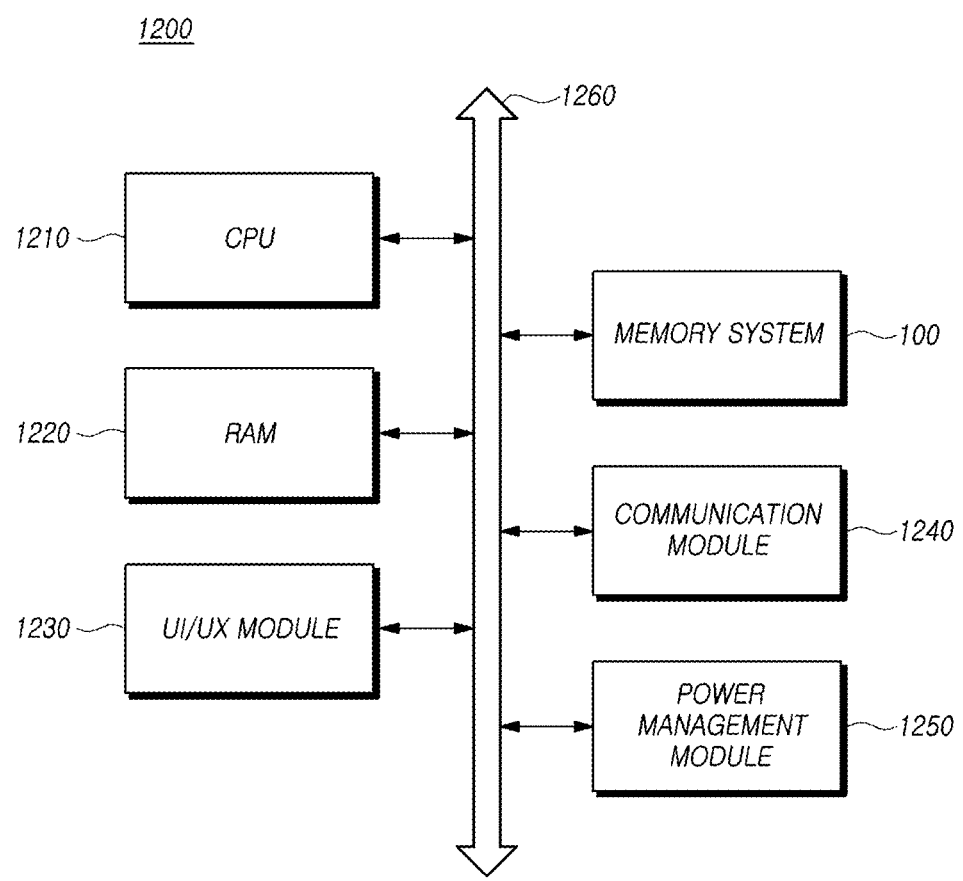
FIG. 12 is a diagram illustrating the configuration of a computing system based on embodiments of the disclosed technology.

FIG. 12 is a diagram illustrating the configuration of a computing system 1200 based on an embodiment of the disclosed technology.

Referring to FIG. 12, the computing system 1200 based on an embodiment of the disclosed technology may include: a memory system 100 electrically connected to a system bus 1260; a CPU 1210 configured to control the overall operation of the computing system 1200; a RAM 1220 configured to store data and information related to operations of the computing system 1200; a user interface/user experience (UI/UX) module 1230 configured to provide the user with a user environment; a communication module 1240 configured to communicate with an external device as a wired and/or wireless type; and a power management module 1250 configured to manage power used by the computing system 1200.

The computing system 1200 may be a personal computer (PC) or may include a mobile terminal such as a smartphone, a tablet or various electronic devices.

The computing system 1200 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be minimized. In addition, based on an embodiment of the disclosed technology, an overhead occurring in the process of calling a specific function may be minimized. Although various embodiments of the disclosed technology have been described for illustrative purposes, various modifications, additions and substitutions can be made based on what is described and illustrated in this patent document.

What is claimed is:

1. A memory system comprising:
a memory device including memory cells to store data and operable to perform an operation on one or more memory cells including, a read operation for reading data stored in one or more memory cells, a program operation for writing new data into one or more memory cells, or an erase operation for deleting stored data in one or more memory cells; and
a memory controller in communication with the memory device and configured to control the memory device to perform an operation,
wherein the memory controller is configured to:
suspend a target operation that is being executed by the memory device based on i) whether or not to execute a first operation of resetting a reference read bias when a failure occurs in a read operation executed after the target operation is suspended, and ii) a number of times the target operation is suspended, and
wherein the target operation includes a program operation or an erase operation that has been in progress when suspending the target operation.

2. The memory system of claim 1, wherein the memory controller is configured to suspend the target operation upon a determination that the first operation is not executed, and that the suspension count of the target operation is less than a first reference number of suspensions.

3. The memory system of claim 2, wherein the memory controller is configured to, when suspending the target operation after the target operation is resumed from a previous suspension, suspend the target operation only after a predetermined minimum delay time has passed since the resumption of the target operation.

4. The memory system of claim 3, the memory controller is configured to determine the predetermined minimum delay time depending on whether the suspension count of the target operation is greater than or equal to a second reference number of suspensions when the target operation is an erase operation.

5. The memory system of claim 1, wherein the memory controller is configured to resume the target operation based on whether the first operation is performed, and based on a number of the read operation executed after the target operation is suspended.

6. The memory system of claim 5, wherein the memory controller is configured to resume the suspended target operation upon a determination that the first operation is executed, or that the number of the read operation executed after the target operation is suspended is greater than or equal to a first number of read operations.

7. The memory system of claim 6, wherein the memory controller is configured to resume the suspended target operation upon a determination that the target operation is an erase operation, and that the number of the read operation executed after the target operation is suspended is greater than or equal to a second number of read operations.

8. The memory system of claim 7, wherein the memory controller is configured to update the second number of read operations depending on whether a total number of the read operation executed while the target operation is in progress is greater than or equal to a third number of reads.

9. The memory system of claim 8, wherein the third number of read operations is proportional to the suspension count of the target operation, and a reference number of read operations per suspended operation.

10. A memory controller comprising:
a memory interface configured to communicate with a memory device; and
a processor configured to communicate with the memory device through the memory interface to suspend the target operation based on whether a first operation configured to reset a reference read bias is performed upon occurrence of a failure in a read operation executed after the target operation is suspended, and based on a suspension count of the target operation,
wherein the target operation includes a program operation or an erase operation that has been in progress when suspending the target operation.

11. The memory controller of claim 10, wherein the processor is configured to suspend the target operation upon a determination that the first operation is not executed, and that the suspension count of the target operation is less than a first reference number of suspensions.

12. The memory controller of claim 11, wherein the processor is configured to, when suspending the target operation after the target operation is resumed from a previous suspension, suspend the target operation only after a predetermined minimum delay time has passed since the resumption of the target operation.

13. The memory controller of claim 12, wherein the processor is configured to determine the predetermined minimum delay time depending on whether the suspension count of the target operation is greater than or equal to a second reference number of suspensions when the target operation is an erase operation.

14. The memory controller of claim 10, wherein the processor is configured to resume the target operation based on whether the first operation is performed, and based on a number of the read operation executed after the target operation is suspended.

15. The memory controller of claim 14, wherein the processor is configured to resume the suspended target operation upon a determination that the first operation is executed, or that the number of the read operation executed after the target operation is suspended is greater than or equal to a first number of read operations.

16. The memory controller of claim 15, wherein the processor is configured to resume the suspended target operation upon a determination that the target operation is an erase operation, and that the number of the read operation executed after the target operation is suspended is greater than or equal to a second number of read operations.

17. The memory controller of claim 16, wherein the processor is configured to update the second number of read operations depending on whether a total number of the read operation executed while the target operation is in progress is greater than or equal to a third number of reads.

18. The memory controller of claim 17, wherein the third number of read operations is proportional to the suspension count of the target operation, and a reference number of read operations per suspended operation.

19. An operation method of a memory system, the method comprising:
determining, while a target operation is in progress, whether a first operation configured to reset a reference read bias is performed upon occurrence of a failure in a read operation executed after the target operation is suspended, and based on a suspension count of the target operation; and
suspending the target operation based on whether the first operation is performed and the suspension count of the target operation,
wherein the target operation includes a program operation or an erase operation that has been in progress when suspending the target operation.

20. The operation method of claim 19, further comprising resuming the target operation based on whether the first operation is performed and based on a number of the read operation executed after the target operation is suspended.

* * * * *